United States Patent [19]
Skinner et al.

[11] 4,179,104
[45] Dec. 18, 1979

[54] MECHANICAL ATTENUATOR

[75] Inventors: Robert I. Skinner; Arnold J. Heine, both of Wellington, New Zealand

[73] Assignee: Development Finance Corporation of New Zealand, Wellington, New Zealand

[21] Appl. No.: 756,607

[22] Filed: Jan. 4, 1977

Related U.S. Application Data

[63] Continuation-in-part of Ser. No. 575,747, May 8, 1975, abandoned.

[51] Int. Cl.² .............................................. F16F 1/16
[52] U.S. Cl. ..................................... 267/154; 52/167; 188/1 B
[58] Field of Search ............... 188/1 B, 1 C; 267/154, 267/160; 52/167, 401

[56] References Cited
U.S. PATENT DOCUMENTS
3,831,924  8/1974  Skinner ........................... 188/1 C X

*Primary Examiner*—Duane A. Reger
*Attorney, Agent, or Firm*—Holman & Stern

[57] ABSTRACT

A mechanical attenuating system for preventing horizontal forces from being transmitted from a base such as the ground to a structure such as a building or a nuclear reactor resting on that base. The system has two components: a vertical support which allows free relative horizontal movement between structure and base, and horizontal damping. The two can be combined into a single instrument. When the two are used separately, the support may be supplied by rubber or rolling bearings, by flexible columns or by tendons.

13 Claims, 17 Drawing Figures

MECHANICAL ATTENUATOR

CROSS-REFERENCE TO RELATED APPLICATION

This is a continuation-in-part of application Ser. No. 575,747 filed on May 8, 1975, now abandoned.

FIELD OF INVENTION

This invention relates to a mechanical attenuator, in particular to an attenuator to reduce earthquake forces on a structure or on a part of a structure.

BACKGROUND OF THE INVENTION

In general, structures resist earthquake attack by a combination of strength, (that is, ability to withstand large forces while remaining elastic), deformability, and energy-absorbing capacity. In initial approach in aseismic design placed emphasis on the strength aspect and increased strength was provided to resist horizontal earthquake forces. However, it was eventually shown that such structures are deformed well beyond their elastic limit during severe earthquakes and that the structures survived because they were capable of deforming inelastically, which gave both increased flexibility and energy absorption.

The principal approach to aseismic design then became the design of structures with a large capacity for plastic deformation so that strength requirements could be reduced, thereby leading to a reduction in structural cost without any loss in earthquake resistance. The approach remains as the one most used for high-rise construction today, but it suffers from several disadvantages:

(i) Progressive deterioration of the structural components can occur under the cyclic loading produced by a strong-motion earthquake.
(ii) Large relative movements are necessary to achieve significant energy absorption and for example, building facings, partitions and services may be damaged.
(iii) Such high-strength structural forms as shear walls or shear towers, frames with deep beams and wide columns, stiff peripheral frames, diagonally-braced space frames and shells and diaphragms, which can be built at relatively low cost, must be excluded because they have little capacity for plastic deformation.

If the earthquake-generated forces could be reduced without the need for plastic deformation, these low-cost forms of construction could be employed. Rather than relying on plastic deformation of the structure components, which leads to damage of the structure, replaceable energy-absorbing devices could be distributed throughout the structure.

This procedure is adopted for some tall buildings in Japan, in which energy absorption takes place in reinforced concrete panels, which are provided with slits to give regions of hysteretic absorption of energy. Alternative absorbers, utilizing the hysteretic deformation of steel beams are described and claimed in U.S. Pat. Nos. 3,831,924 issued Aug. 27, 1974 entitled "Tortional Energy Absorber" and 3,963,099 issued on June 16, 1976, entitled "Hysteretic Energy Absorber." Any of the forms of damper described or claimed in those patents may be used. However, if the absorbers are incorporated in the structure they are effective only during substantial deformations of the structure and therefore there is still a likelihood of considerable secondary damage.

Recent earthquakes have demonstrated that all these techniques adopted to protect structures, structural functions, and non-structural components from impairment by earthquake attack are only partially successful.

Most of the problems associated with current methods for providing earthquake resistance would be removed if the energy absorption and flexibility required to reduce earthquake generated forces could be provided by a system which is independent of the structural components. This concept leads immediately to the idea of a mechanical attenuator between the structure and the foundation on which it stands.

Attenuators, to be placed between equipment and the base on which it stands, to reduce forces arising from impulsive of cyclic motion of the base are well known. These usually consist of a flexible system combined with a damping system. Heretofore there has been no practical proposal for a combination of a flexible system together with a damping system adapted for use in an earthquake attenuator for structure.

It is therefore an object of the present invention to provide a mechanical attenuator that will go some way to supply this need without the drawbacks aforesaid, or will at least provide the public with a useful choice.

The hysteretic dampers aforementioned are practical and low-cost dampers which may be used in such attenuators. There exist a number of practical base-support systems which allow a more or less free undamped, horizontal motion of the base of a structure. A combination of such a base support system and the recently developed hysteretic energy absorbers constitutes a practical earthquake isolation system of mechanical attenuator for structures.

SUMMARY OF THE INVENTION

Accordingly, the invention may be said to consist in a mechanical attenuator adapted to be interposed between a structure and a base on which the structure rests, said mechanical attenuator comprising in combination:
  at least one support having flexibility in a horizontal direction of motion of at least a major portion of the structure; and
  at least one hysteretic energy absorber capable of absorbing horizontal accelerator forces originating from earthquakes and consequential motions, said hysteretic energy absorber being adapted so as not to be actuable by normal ambient accelerating forces.

In an alternative aspect, the invention may be said to consist in a method of attenuating accelerating forces originating from earthquakes and consequential motions between a foundation and a structure resting thereon, comprising the steps of:
  (a) isolating a foundation from the structure resting thereon by allowing for limited relative movement in a horizontal direction between said foundation and said structure;
  (b) absorbing horizontal accelerating forces originating from earthquakes and consequential forces imparted to said structure by means of an hysteretic energy absorber; and,
  (c) withstanding normal ambient accelerating forces imparted to said structure by means of said hysteretic energy absorber.

BRIEF DESCRIPTION OF THE DRAWINGS

Embodiments of the invention will now be described, by way of example only, with reference to the accompanying drawings, in which.

DESCRIPTION OF THE PREFERRED EMBODIMENTS

When the foundation of a structure with a mechanical attenuator system is subjected to the motion of a major earthquake, such as might be considered for the purposes of earthquake-resistant design, the lowest point of the structure may move cyclically with a maximum horizontal motion of about 3" from its rest position. In an exceptionally large earthquake, which might be considered for the design of a very important structure, this point may move 6" or 9". During wind storms or moderate earthquakes, the hysteretic dampers limit motions to a small fraction of an inch.

In the case of a bridge, it will frequently be most practical to install the isolation system between the bridge deck, or sections of the bridge deck, on the one hand, and the pier tops and abutments, on the other hand.

Figure 1:
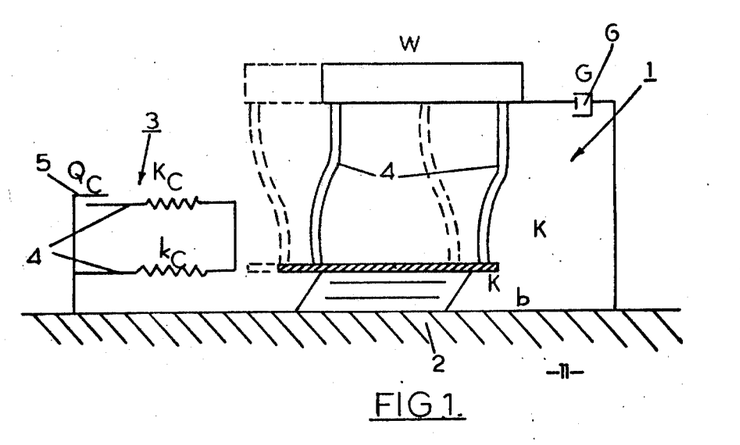
FIG. 1 is a model of the invention, applied to a structure.
Figure 2:
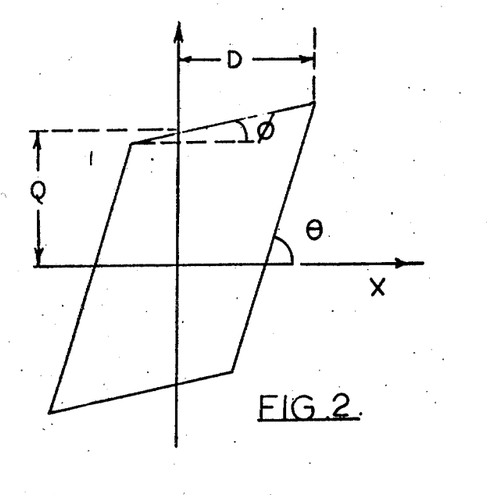
FIG. 2 is a simplified typical hysteresis loop of a hysteretic damper.

A structure 1 supported on a flexible mounting 2 which allows horizontal motion, and constrained by hysteretic dampers 3, may be approximated by a set of linear springs 4 a coulomb damper 5 and a viscous damper 6 as shown in FIG. 1. The static response of this system is bilinear hysteretic. For symmetric cycling, the response is given by FIG. 2, where:

$$\tan \theta = \frac{(K_c + k_c + K_b) K}{K_c + k_c + K_b + K} \quad (1)$$

$$\tan \phi = \frac{(k_c + K_b) K}{k_c + K_b + K} \quad (2)$$

$$Q = Q_c - Q_c \tan \phi / K \quad (3)$$

and where:

$K_c, k_c, Q_c$, are the spring stiffnesses and the coulomb force required to represent the hysteretic dampers 3, $K_b$ = transverse stiffness of the flexible mountings 2, K = spring stiffness to give the structural period.

Further quantities to be defined are:

W = effective weight of the structure 1

$\zeta$ = assumed viscous damping factor

T = natural period of structure $T_b$ = period of weight W if mounted directly on the flexible bearings.

Since the base motions will contain relatively little acceleration of short period, the effective structural weight can be approximated by the total weight, particularly when the structural period is short. Furthermore, since the structural damping and the bearing damping are comparable, they are represented in FIG. 1 by a single viscous damper 6 which contributes a damping factor $\zeta$.

An approximate analytical technique for deriving the earthquake generated formations and forces which arise in the idealized structure of FIG. 1 is described in Section 11.3 of Newmark and Rosenbleuth (1971). This approach has the advantage that the structural character and the earthquake character can be dealt with independently, as in the normal mode approach to the response of elastic structures. This approximate approach gives a broad view of the response of bilinear hysteretic systems to a wide range of earthquakes.

Following Newmark and Rosenbleuth, the mean effective period and the mean effective damping factor are given by $T' = D_y T_2 / D$
$+ 2\pi(W/g)^{\frac{1}{2}} (Bx^2 = Qx)^{\frac{1}{2}}/B - QB^{-3/2}\ln\{(Bx)^{\frac{1}{2}} + (Bx + Q)^{\frac{1}{2}}\}By$
$\qquad\qquad D > D_y$ $\zeta' = \zeta$
$+ \frac{25}{D\pi} (L_1/B)\ln(Bx^2 + Qx) + (L_1/B - L_2/Q)\ln\{1 + Q/(Bx)\}By$
$\qquad\qquad D > D_y$ where:

$D_y = Q/(\tan \theta - \tan \phi)$

T' = means period
$\zeta'$ = mean damping factor, percent of critical
D = maximum displacement of weight W
$T_2$ = period, $D < D_y$
B = tan $\phi$
$L_1 = 4Q$
$L_2 = -4QD_y$ Note that $D_y$ is the displacement of the weight W at which yielding of the hysteretic damper first occurs under static loading.

By computing mean periods and dampings for a range of values for the components shown in FIG. 1, using values for $K_c/Q_c$ and $k_c/Q_c$, which best approximate test results of large prototype torsional-beam energy absorbers and applying them to a representative set of earthquake displacement spectra, we found that the isolation system gives a large reduction in the earthquake attack on elastic structures with periods up to one second. For this period range, the displacements can be accommodated readily by rubber bearings and by hysteretic energy absorbers. Even the displacements for twice the design earthquake are acceptable.

A practical way of providing a resilient member is to use rubber bearing pads which are flexible for motion in any horizontal direction. Appropriate rubber bearings are described by Lindley (1970). Buildings are already being constructed on such bearings for purposes of noise and ambient vibration isolation.

The supporting bearings must be flexible for transverse motions, but relatively rigid for vertical motions. Laminated bearings consisting of horizontal rubber sheets separated by metal plates have these characteristics because the Poisson ratio of rubber is almost 0.5.

Bearings with an effective rubber thickness of 6", when installed under a rigid structure with sufficient bearing area to achieve normal working stresses, result in a system with an undamped period for transverse vibrations of about 2 seconds, and for vertical vibrations of 0.1 seconds.

It is found that rubber bearings of the general pattern described by Lindley (1970) add about 5% to the damping coefficient provided by the hysteretic dampers to be described. A special form of butyl rubber damper may add 10%. These degrees of damping will not cause the rubber to overheat during a normal major earthquake.

Since the useful life of rubber dampers is not known, provision is made for replacement in embodiments of the present invention.

Figure 3:
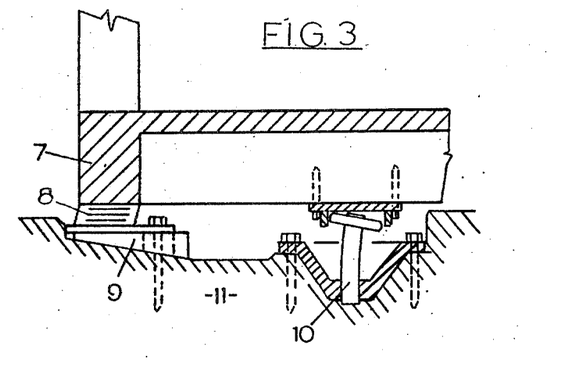
FIG. 3 is a schematic drawing of a mechanical attenuator, using a flexural-beam hysteretic damper. The form of damper there shown may be replaced by any of the other forms described or claimed in the abovementioned U.S. Pat. Nos. 3,821,924 and 3,963,099.
Figure 4:
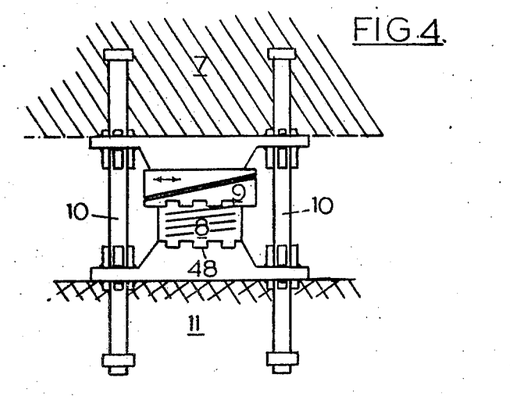
FIG. 4 is a schematic drawing of a unit combining a flexible support with flexural-beam dampers.

In FIGS. 3 and 4, the lowest level of a structure 7 rests on a rubber pad or bearing 8. The rubber carries the greater part of the weight of the structure and is loaded by wedges 9. The damping is supplied by steel hysteretic members, and in FIG. 4 they are anchored to the structure and to the foundation 11 to resist overturning forces. If the weight were not carried by the rubber 8, but by steel members 10, they would collapse when they were sufficiently deflected.

Figure 5:
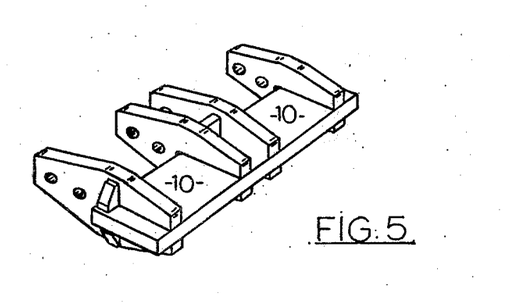
FIG. 5 is a schematic drawing of a torsional-beam hysteretic damper.
Figure 6:
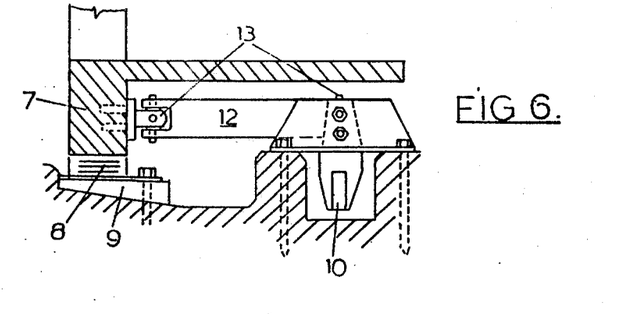
FIG. 6 is a schematic drawing, partly in cross-section, and as seen in AA in FIG. 8 of a typical combination of a flexural support and a torsional-beam hysteretic damper.
Figure 7:
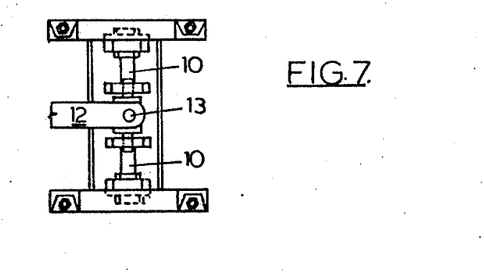
FIG. 7 is a plan view of part of FIG. 6.
Figure 8:
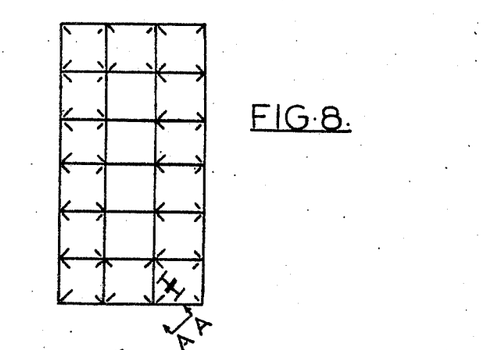
FIG. 8 is a skeleton plan of a structure, showing a possible arrangement of mechanical attenuators using torsional-beam dampers.

The dampers may be flexural, as shown in FIG. 3, (single ended), and FIG. 4 (double ended), or torsional as shown in FIGS. 5, 6 and 7. In FIGS. 6 and 7 a link 12 connects the central arms which extend from the torsional member 10 to the structure 7 through universal joints 13.

Figure 16:
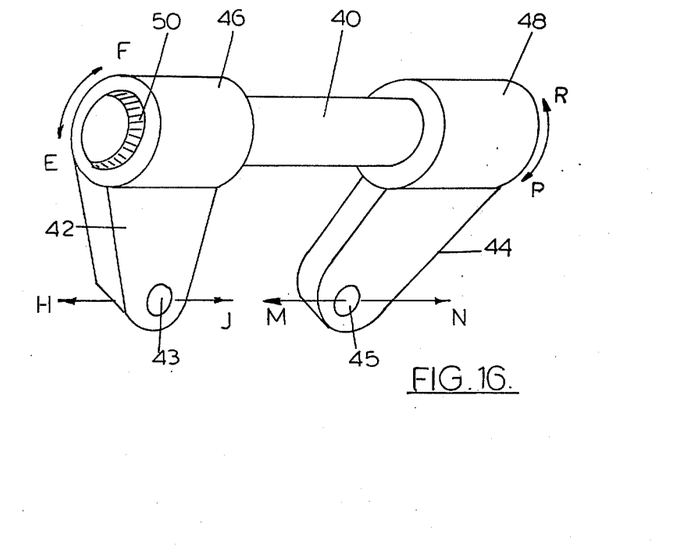
FIG. 16 is a schematic drawing of a torsional flexural beam hysteretic damper having two remote mounting arms, and, FIG. 17 is a schematic drawing of a torsional/flexural beam hysteretic damper having one remote mounting arm.
Figure 17:
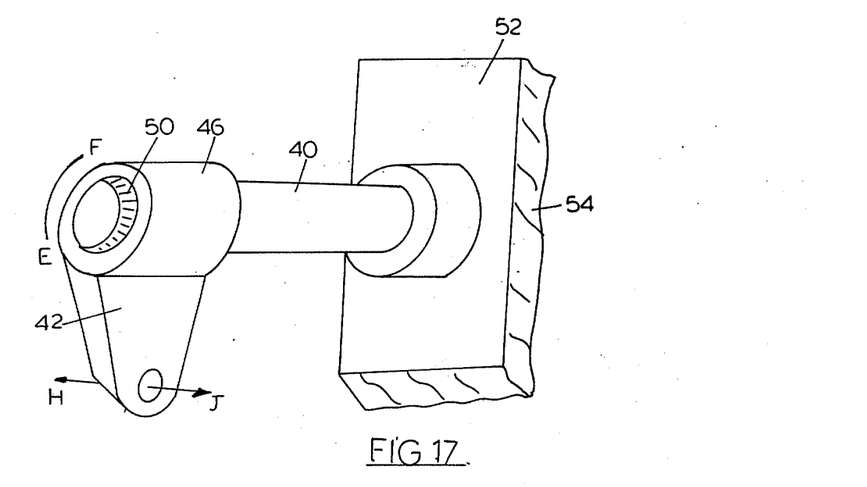

A particularly desirable form of damper is illustrated in FIGS. 16 and 17. The damper illustrated is a beam type hysteretic damper which dampens motion in both a flexural mode and in a torsional mode.

The beam illustrated in FIG. 16 comprises a main beam 40. The beam illustrated is circular in cross-section and is made of mild steel. Other types of cross-section may be substituted without significant change in damping properties. Toward either end of beam 40 there are provided collars 46 and 48 from which project radially arms or webs 42 and 44 respectively. Mounting holes 43 and 45 may be provided in arms 42 and 44. These are joined to conventional mounting means such as a bracket, on a base member at one end and on a structural member at the other.

In addition, ball joints or other commonly employed mounting means may be provided to allow further flexibility between structure and/or base and damper. In the embodiment illustrated beams 40 are welded at welds 50 at the outside ends of collars 46 and 48. It will be appreciated that the weld should be positioned at a point remote from the point of maximum flexural or torsional strain in beam 40. In operation when a structure is subjected to accelerating forces arising from earthquakes and consequential motions, arms 42 and 44 move toward or away from one another in the directions H and J, on the one hand, and M and N on the other. This flexural motion is damped by bending motions in beam 40. Torsional motion illustrated by the arrows EF on the one hand and PR on the other is damped by twisting motions in beam 40. Mounting holes 43 and 45 on arms 42 and 44 respectively, being remote from beam 40, allow for greater movements in the structure being reduced to lesser motions in the damping beam 40.

In FIG. 17, arm 44 and collar 48 are not present. Instead one end of main beam 40 is journalled in a tight fitting socket 54 directly onto either a base or a structure 52. Typically 52 is a base such as a foundation or the like and arm 42 is joined to the structure to allow for maximum flexibility in relation to the joint between the structure and a base.

In each of FIGS. 16 and 18 there is illustrated a fillet weld 50 retaining collars 46 and 48 in place on beam 40. However, collars 46 and 48 can also be split collars which are clamped together onto beam 40 with equal effect.

EXAMPLE

The design of an isolation system for a major structure may be illustrated by considering a typical stiff 10-storey frame building of 6 bays by 3 bays, with plan dimensions of 200 ft × 100 ft and total weight of 30,00 Kips.

There is a standard commercial rubber bearing with the following features:
Dimensions—23"×23"×6.25"
Load Capacity—530 Kips
Shear Stiffness—11.1 Kips/inch
Compressive Stiffness—4,110 Kips/inch Vertical support for a static load of 30,000 Kips requires about 56 bearings or 2 per column. A third bearing is provided at the foot of each exterior column to resist additional vertical forces arising from wind or earthquake loads, giving a total of 74 rubber bearings. A completely rigid building of 30,000 Kips weight, mounted on these bearings, would have a translational period of 2 seconds and a vertical period of 0.1 seconds.

The required damper force can be obtained with 28 hysteretic dampers, each with a damper force of 55 Kips.

The devices of FIG. 5, which are described and claimed in abovementioned U.S. Pat. Nos. 3,831,924. The specifications, claims and drawings of these patents are hereby incorporated into the present specification by reference. These devices absorb energy primarily by the torsional plastic deformation of rectangular-section mild-steel beams, are reliable and effective low-cost hysteretic dampers. If these dampers are used each will act for a single component of base motion and hence 56 absorbers, or 2 per column, are required. Possible locations and orientations for the torsional-beam damper of 55 Kips capacity would weigh about 800 lbs., and would occupy a space of about 30"×24"×20". A typical isolator unit using such a damper and rubber bearings is shown schematically in FIGS. 6 and 7. The outer pair of arms are fixed to the foundations and the central arms are linked to a beam near the base of a column.

Figure 9:
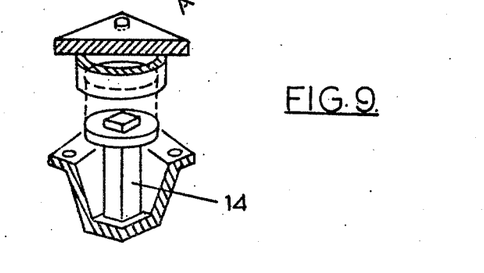
FIG. 9 is a schematic drawing of a flexural-beam hysteretic damper.

An alternative hysteretic damper which is compact and convenient to install is shown schematically in FIG. 9. It is described and claimed in aforementioned U.S. Pat. No. 3,963,099. It utilizes a short vertical steel cantilever 14 which is plastically deformed primarily in flexure and will operate for base translations in any horizontal direction. Consequently only 28 of these devices would be required for the building considered here. A typical isolator using this flexural-beam damper and rubber bearings is shown in FIG. 3.

Various practical requirements for the isolation system must be considered. Provision should be made for replacement of energy absorbers in case damage is caused by extreme wind or earthquake attack. It may also be necessary to remove the net plastic deformations which remain after a severe earthquake.

The creep of rubber bearings is small and should pose no problem for normal structures. For special structures in which support levels are critical, or where extreme lateral flexibility or large motions are required, other methods of support such as slender columns, hanging links or roller or ball bearings, may be appropriate. These we illustrate in FIGS. 10 to 13.

Figure 10:
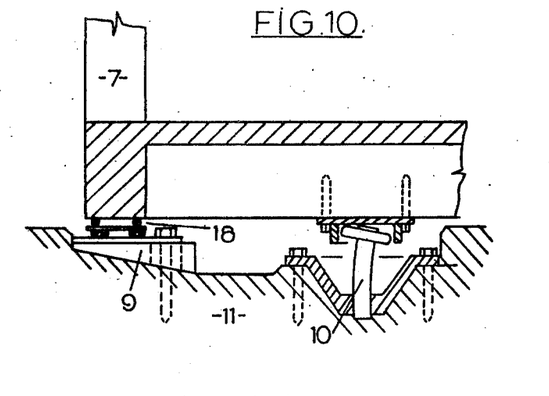
FIG. 10 is a schematic drawing in which the rubber support of FIG. 3 is replaced by ball races.
Figure 11:
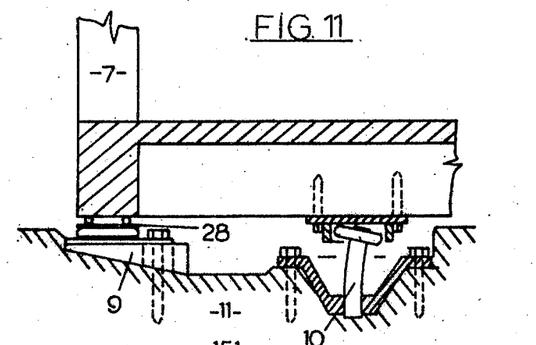
FIG. 11 is a schematic drawing in which the rubber support of FIG. 3 is replaced by rollers.

In FIGS. 10 and 11 the rubber pad 8 of FIG. 3 (this discussion is equally adapted to FIG. 7) is repaced by two sets of ball bearings 18 and of rollers 28 respectively. There are two layers of rolling bearings, each consisting of a group of bearings running in one direction between steel plates. The directions of the two layers are approximately at right angles. As when rubber is used, the bearings are loaded by wedges, jacking or similar means.

Figure 12:
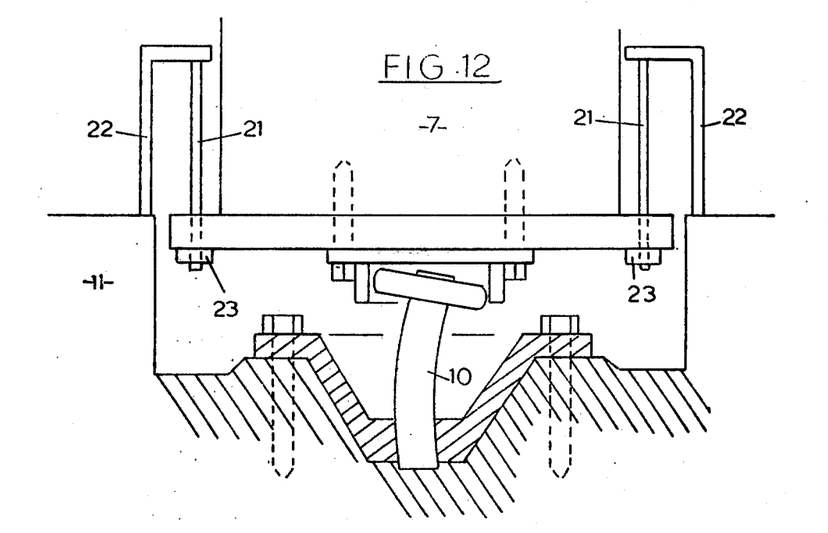
FIG. 12 is a schematic drawing in wich the rubber support of FIG. 3 is replaced by hanging tendons.

FIG. 12 shows a schemiatic arrangement for a variation on the use of bearings for supporting most of the load. Any mechanical equivalent of the arrangement shown may be used. In essence the weight of the structure 7 is taken by tension members 21, supported on suitable structures 22, which in turn are supported on the foundation 11. Dampers 10 may be fitted as before. The tension members 21 may be stressed by nuts 23 or by equivalent means.

Figure 13:
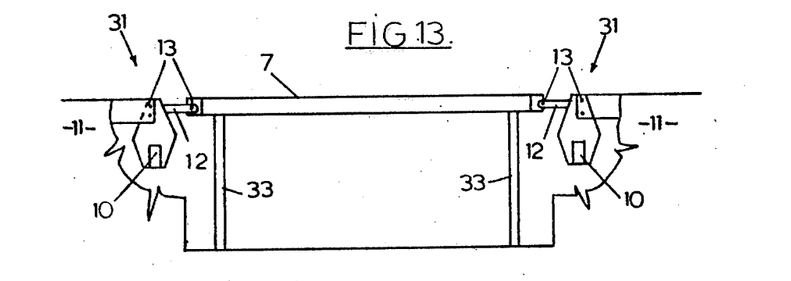
FIG. 13 is a schematic drawing in which the rubber support of FIG. 3 is replaced by slender columns.
Figure 14:
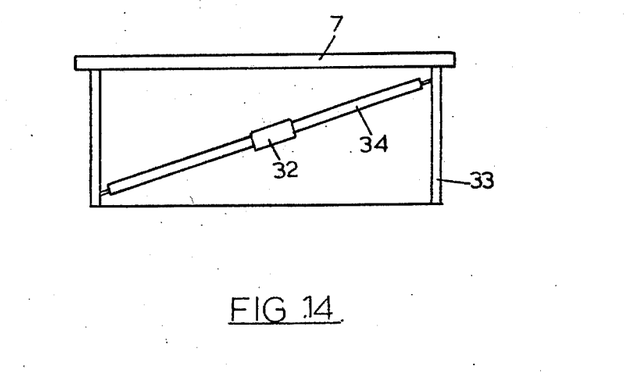
FIG. 14 is similar to FIG. 13, but with the dampers differently disposed.

FIGS. 13 and 14 show two methods of using the conventional flexible bottom storey with two alternative arrangements of hysteretic dampers. In FIG. 13 the flexible bottom storey is a basement, and dampers 31 of the type of FIG. 4 may be applied at ground level. In FIG. 14 a hysteretic damper 32 is built into a diagonal brace 34. On both FIGS. 33 are slender columns.

The temperature rises which occur in the rubber bearings supporting a structure, as a result of very severe earthquake deformations, are quite moderate. A check shows that the temperature rise of a typical natural rubber bearing, which has a damping factor of 5%, will be about 30° F. after it has been deformed through ±6" for 100 cycles. It is assumed that no heat is transferred from the rubber layers. A displacement of 6" corresponds to the maximum displacement which occurs during attach by an earthquake which is 1.5 times the intensity of a typical design earthquake.

Certain other precautions are necessary. Those bearings near the periphery of the building should be provided with positive keys 48 on their upper and lower surfaces as shown in FIG. 4, as uplift during earthquakes or exceptional wind storms may reduce normal forces until surface friction is insufficient to resist the bearing shear forces. Since the life of rubber bearings is not known, provision should be made for their replacement. This may be achieved by placing the bearings on wedges as shown schematically in FIGS. 3, 4, 6, 10 and 11. The wedge insertion force would be that necessary to give the required vertical loading on each bearing.

When a building is mounted on a base-isolation system the problem of protecting piped and cabled services against damage due to deformation is concentrated at the foundation-base interface. The techniques which accommodate large local deformations in service lines are well known and should not be expensive, particularly since only a few tens of cycles of large deformation are to be expected during the life of the building.

FIG. 4 represents an attenuator of a different pattern from those shown in other Figures. In the others the flexible system and the damping system are separately incorporated in a building. In FIG. 4 a single unit incorporates both flexibility and damping. It is therefore generally applicable. Other forms having this property are considered to be obvious developments from FIG. 4.

BASE ISOLATION FOR BRIDGES

The design of earthquake-resistant bridges presents special problems since a bridge must also be designed to accommodate large relative displacements and an unusual set of loads. Relative displacements arise from thermal changes, creep and foundation settlement, and also from ground deformations during earthquakes. The loads include those due to moving and accelerating traffic, to wind, and to earthquake accelerations.

Major components of a bridge are interconnected by bearings, now usually of rubber, which allow relative translation and rotation without the introduction of large stresses. Relative horizontal motion must be restricted in order to resist loads due to wind, traffic, and earthquakes.

Problems may arise when an attempt is made to introduce an isolating system (i.e. one or more mechanical attenuators) between the bridge and its supporting foundations and abutments. Base isolation may prevent cantilever action by a pier. Again the environment at the foot of a pier may be unsuitable for the installation of an isolating system. In most cases it is more practical to provide an isolating system between the bridge deck and the pier tops and abutments. The location of hysteretic dampers would be restricted to allow any necessary relative motion between the bridge components.

A model which represents the essential features of a bridge with isolation between the bridge deck and its supports is still a bilinear hysteretic system for static loads, but it has two degrees of freedom for dynamic motion. For a given ratio of damper force to structural weight this bridge system would have a somewhat lower effective damping coefficient than the corresponding building system. However, substantial reductions in earthquake forces should still be obtained.

Figure 15:
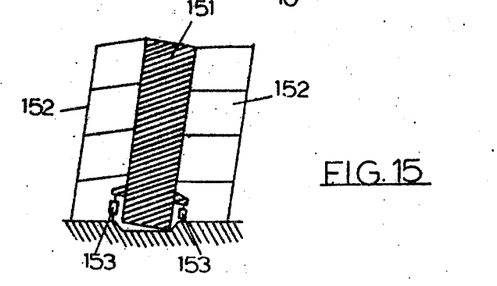
FIG. 15 is a schematic drawing in which the rubber support of FIG. 3 is replaced by freedom of part of the structure to "step,"

FIG. 15 shows a method of dealing with structures which have a relatively stiff and a relatively flexible part. FIG. 15 shows schematically a building with a tall, stiff tower 151 and two flexible wings 152. With relatively minor modifications the figure can represent a bridge in which 15a is a pier, and only the upper storey of 152 exists as a deck. A horizontal movement of the structure as a whoe can be achieved if tower 151 is allowed to "step" as shown. Dampers 153 can be fitted in parallel with the stepping location.

BASE ISOLATION FOR NUCLEAR REACTORS

It is essential that a power reactor which operates in a seismic area has the ability to shut down safely when under attack by an earthquake. To ensure its safety a power reactor has a complex system of controls, together with back-up controls and emergency cooling, and these systems must all operate with high reliability during a severe earthquake. When all safety features are attacked simultaneously by a very severe and complex forces then many possibilities for common mode failure are created, thus rendering difficult the achievement of very high overall reliability. For example the forces may cause core meltdown plus pipe fracture plus containment vessel fracture. For complex mechanical systems much greater reliability can be achieved by excluding large applied forces than by designing the system to operate under such forces.

Base isolation should provide an efficient means for ensuring a very high degree of earthquake resistance for a reactor power complex. A site on competent rock could be chosen to minimize longer period ground accelerations since these are more difficult to attenuate with a base isolation system. All components of the reactor complex which are necessary to ensure safe operation and reliable emergency shut-down of the power reactor should then be mounted on a high-strength raft. This raft would be supported on rubber bearings or by hanging tendon s as in FIG. 2, and constrained by hysteretic dampers anchored to the foundations, which in turn would be thoroughly keyed to the underlying rock.

Many specific structures and machines benefit particularly from a system which isolates them from earthquake forces. Some structures are lightly damped and are liable to brittle failure. Other structures are liable to damage from earthquake-induced deformations. If a machine or a small structure is mounted within a major structure it may be subjected to increased earthquake forces due to the appendage effect.

High-voltage electrical systems, supported on insulators which act as vertical cantilevers or as flexural columns, have low self-damping and no plastic reserve. They are liable to suffer a resonant magnification of horizontal earthquake forces, and brittle failure of the insulators. Electrical systems which have this form include large circuit breakers, large inductance chokes of high-voltage D.C. lines, and mercury tank rectifiers and inverters.

Brittle electrical structures may be mounted on a platform or frame which is isolated from foundation accelerations by a set of rubber bearings and hysteretic dampers. The transverse loads which the insulator columns must resist are then much reduced.

DISCUSSION

For structures which are insufficiently flexible to attenuate earthquake forces the base isolation system of the present invention is an attractive alternative to present methods for providing earthquake resistance. Base isolation should provide better performance at lower cost. For special structures or equipment which have an inherently low resistance to earthquake forces or deformations, base isolation is particularly attractive. Again for those structures in which the consequences of earthquake damage are particularly serious, isolating systems provide a more reliable form of earthquake resistance.

When an isolating system reduces the earthquake forces on a structure a design constraint is removed or considerably reduced, and this results in increased architectural freedom. Designs which are closer to those used in non-seismic areas may be adopted. This allows both architects and engineers to draw more freely on the knowledge and experience accumulated in such non-seismic areas. Furthermore, a wider choice of structural forms and materials is available. In general less flexible structures will result, and the hazards and expense associated with non-structural damage may be greatly reduced. For example a more rigid building is much less likely to shed facing panels and broken glass.

Base isolation systems lead to simpler and more reliable structural designs, for when non-linear hysteretic deformations are confined to the base level of a structure, the behaviour of the structure is much simpler than when such deformations (plastic hinges) occur at many positions throughout the structure. Within this simplification it is practical to adopt much more thorough seismic design procedures which take full account of the forces and deformations that may arise from a wide range of possible earthquakes. Moreover the characteristics of the structural components are more accurately known and they retain these characteristics more reliably. The main structural components suffer little plastic deformation and therefore their parameters change little from their elastic values. Moreover they are not liable to severe but ill-defined degrees of deterioration. Again, the components of the isolating system are subject to thorough laboratory study and their characteristics are accurate and reliably maintained.

A benefit which follows from the use of specialised components to provide earthquake resistance is the transfer of technology. An improvement in the performance of hysteretic absorbers or of flexible bearings can increase the earthquake resistance of a very large range of structures and equipment, from buildings to nuclear reactors. Benefits may be retroactive: improved isolator components may be substituted for inferior or defective components in existing structures.

REFERENCES

P. B. Lindley, Engineering Design with Natural Rubber, N.R. Technical bulletin, 3rd Edition, Natural Rubber Producers Research Association, London 1970.

N. W. Newmark and E. Rosenbleuth, Fundamentals of Earthquake Engineering, Pretice-Hall, New Jersey, 1971.

What we claim is:

1. In a structure such as a building, a bridge or a nuclear reactor said structure resting on a base, the improvement comprising at least one support interposed between a first portion of said structure and said base, said support carrying at least a part of the weight of the structure and having flexibility in a horizontal direction of motion of at least a major portion of the structure and at least one hysteretic energy absorber connected between a further portion of said structure and a further portion of said base for absorbing horizontal accelerating forces originating from earthquakes and consequential motions, said hysteretic energy absorber being substantially unaffected by normal ambient accelerating forces.

2. The improvement as claimed in claim 1 wherein said support includes a laminated rubber bearing.

3. The improvement as claimed in claim 1 wherein said at least major portion of said structure is held to the base by its weight and said flexibility in a horizontal direction consists in a freedom of a part of said structure to rock clear of the base.

4. The improvement as claimed in claim 1 wherein said support includes rolling bearings.

5. The improvement as claimed in claim 1 wherein said support includes a set of hanging tendons.

6. The improvement as claimed in claim 1 wherein said support includes a set of slender columns.

7. The improvement as claimed in claim 1 comprising at least one said flexible support and at least one said hysteretic energy absorber combined in a composite unit.

8. The improvement as claimed in claim 1 wherein said flexible support includes an elastic support.

9. The improvement as claimed in claim 1 wherein said hysteretic energy absorber is a torsional/flexural beam hysteretic damper.

10. The improvement as claimed in claim 9 wherein said damper comprises a main beam and a pair of radially projecting remote mounting arms, one at either end of said main beam.

11. The improvement as claimed in claim 9 wherein said damper comprises a main beam and a single projecting remote mounting arm at one end of said beam, the other end of said beam being adapted for direct mounting on one of the group consisting of said structure and said base.

12. The improvement as claimed in claim 1, wherein said hysteretic energy absorber is a torsional beam hysteretic damper.

13. A method for attenuating accelerating forces originating from earthquakes and consequential motions between a foundation and a structure such as a building, a bridge or a nuclear reactor resting thereon, comprising the steps of:
  (a) isolating the foundation from the structure by interposing a support between a first portion of said structure and a first portion of said foundation, said support allowing limited relative movement in a horizontal direction between said foundation and said structure, and
  (b) connecting a hysteretic energy absorber between a further portion of said structure and a further portion of said foundation, for absorbing horizontal accelerating forces originating from earthquakes and consequential forces imparted to said structure, said hysteretic energy absorber being substantially unaffected by normal ambient accelerating forces.

* * * * *